US008052513B2

(12) United States Patent
Koyama

(10) Patent No.: US 8,052,513 B2

(45) Date of Patent: Nov. 8, 2011

(54) GAMING MEDIUM AND GAMING SYSTEM USING GAMING MEDIUM

(75) Inventor: Toshimi Koyama, Koto-ku (JP)

(73) Assignee: Universal Entertainment Corporation, Tokyo (JP)

( * ) Notice: Subject to any disclaimer, the term of this patent is extended or adjusted under 35 U.S.C. 154(b) by 366 days.

(21) Appl. No.: 12/488,742

(22) Filed: Jun. 22, 2009

(65) Prior Publication Data

US 2009/0325665 A1 Dec. 31, 2009

(30) Foreign Application Priority Data

Jun. 26, 2008 (JP) ................................ 2008-166847

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ............................... 463/16; 463/43; 463/47

(58) Field of Classification Search .................... 463/16, 463/42, 43

See application file for complete search history.

(56) References Cited

FOREIGN PATENT DOCUMENTS

| | | |
|---|---|---|
| JP | 2004-102953 | 4/2004 |
| JP | 2004-105321 | 4/2004 |
| JP | 2007-50225 | 3/2007 |

*Primary Examiner* — Dmitry Suhol

*Assistant Examiner* — Kevin Y. Kim

(74) *Attorney, Agent, or Firm* — Oblon, Spivak, McClelland, Maier & Neustadt, L.L.P.

(57) ABSTRACT

A gaming medium includes a wireless tag on a white side thereof, a wireless tag on a black side thereof and a high magnetic permeability member. Each wireless tag stores information to be read magnetically. The high magnetic permeability member is placed between the wireless tags, prevents a magnetic field from affecting the wireless tag on the black side at a time when the information stored in the wireless tag on the white side is magnetically read from the white side, and prevents a magnetic field from affecting the wireless tag on the white side at a time when the information stored in the wireless tag on the black side is magnetically read from the black side.

6 Claims, 11 Drawing Sheets

GAMING MEDIUM AND GAMING SYSTEM USING GAMING MEDIUM

CROSS REFERENCE TO RELATED APPLICATION

This application claims benefit of priority under 35 U.S.C. §119 to Japanese Patent Application No. 2008-166847, filed on Jun. 26, 2008, the entire contents of which are incorporated by reference herein.

BACKGROUND OF THE INVENTION

1. Field of the Invention

The present invention relates to a gaming medium to be used in various games and a gaming system using the gaming medium.

2. Description of the Related Art

Patent documents 1 (Japanese Published Unexamined Application No. 2004-105321) and 2 (Japanese Published Unexamined Application No. 2004-102953) disclose a technique in which, when an X-array antenna and a Y-array antenna emit radio waves, a magnetic field is generated in an upward direction vertical to a table at a cross point where the X-array antenna crosses the Y-array antenna, so as to read information stored in a wireless tag embedded in a gaming chip placed on the cross point. The technique carries out the reading operation by each batting region on the table in series.

Patent document 3 (Japanese Published Unexamined Application No. 2007-050225) discloses a technique in which reversing a gaming medium on a table is recognized by optically reading electronic watermark of the gaming medium into which a barcode is embodied. The technique carries out different output operations between the front side and the back side of a gaming medium.

In reading of information stored in a wireless tag embedded in a gaming medium, in order to recognize that either one of the front side and the back side of a gaming medium is turned up, it is considered that one wireless tag for the front side and another wireless tag for the back side are embedded in the gaming medium.

However, when the magnetically reading operation is carried out with respect to two wireless tags embedded in the gaming medium, it is possible that two pieces of information stored in two wireless tags are simultaneously read or any pieces of information stored in two wireless tags is not read. Namely, when a magnetic field generated by a reading device affects the gaming medium, electric power is supplied to two wireless tags. This allows two signals from two wireless tags to simultaneously return to the reading device. On the other hand, when a magnetic field generated by the reading device affects the gaming medium, change in inductance and/or change in resonance frequency are/is generated in two wireless tags. This prevents electronic power from being supplied to two wireless tags, which causes no signal to return to the reading device.

SUMMARY OF THE INVENTION

It is an object of the present invention to provide a gaming medium of which a reading device accurately reads that either one of the front side and the back side corresponds to the upper side, and a gaming system using the gaming medium.

In order to achieve the object, the present invention provides a gaming medium used in a game during which the gaming medium is placed on a gaming table and reversed from a first side to a second side of the gaming medium or from the second side to the first side, comprising: a first wireless tag mounted on the first side wherein first information stored in the first wireless tag is magnetically read; a second wireless tag mounted on the second side wherein second information stored in the second wireless tag is magnetically read; and a high magnetic permeability member placed between the first wireless tag and the second wireless tag, preventing a magnetic field from affecting the second wireless tag at a time when the first information stored in the first wireless tag is magnetically read using the magnetic field from the first side, and preventing a magnetic field from affecting the first wireless tag at a time when the second information stored in the second wireless tag is magnetically read using the magnetic field from the second side.

According to the present invention, the high magnetic permeability member prevents a magnetic field from affecting the second wireless tag at a time when the first information stored in the first wireless tag is magnetically read using the magnetic field from the first side, and prevents a magnetic field from affecting the first wireless tag at a time when the second information stored in the second wireless tag is magnetically read using the magnetic field from the second side. Therefore, even if a plurality of wireless tags is mounted in the gaming medium, information stored in each wireless tag is surely read.

In order to achieve the object, the present invention provides a gaming system comprising: a gaming table; a gaming medium used in a game during which the gaming medium is placed on the gaming table and reversed from a first side to a second side of the gaming medium or from the second side to the first side, wherein the gaming medium comprising: a first wireless tag mounted on the first side wherein first information stored in the first wireless tag is magnetically read; a second wireless tag mounted on the second side wherein second information stored in the second wireless tag is magnetically read; and a high magnetic permeability member placed between the first wireless tag and the second wireless tag, preventing a magnetic field from affecting the second wireless tag at a time when the first information stored in the first wireless tag is magnetically read using the magnetic field from the first side, and preventing a magnetic field from affecting the first wireless tag at a time when the second information stored in the second wireless tag is magnetically read using the magnetic field from the second side; a reading unit that magnetically reads information stored in the first wireless tag or the second wireless tag of the gaming medium placed in a placement region formed on the gaming table; and an identifying unit that identifies that either one of the first side and the second side corresponds to the upper side of the gaming medium placed in the placement region on the basis of information magnetically read by the reading unit.

According to the present invention, the high magnetic permeability member prevents a magnetic field from affecting the second wireless tag at a time when the first information stored in the first wireless tag is magnetically read using the magnetic field from the first side, and prevents a magnetic field from affecting the first wireless tag at a time when the second information stored in the second wireless tag is magnetically read using the magnetic field from the second side. Therefore, even if a plurality of wireless tags is mounted in the gaming medium, information stored in each wireless tag is surely read.

In a preferred embodiment of the present invention, the high magnetic permeability member includes a first high magnetic permeability member on the firs side and a second high magnetic permeability member on the second side, and a metal material intervenes between the first high magnetic permeability member and the second high magnetic permeability member.

According to the embodiment, since the metal material intervenes between the first and second high magnetic permeability members, even if a magnetic field for reading information stored in one wireless tag is relatively strong, the metal material prevents the magnetic field from affecting another wireless tag at a time when information stored in the one wireless tag is magnetically read using the magnetic field. Therefore, even if a plurality of wireless tags is mounted in the gaming medium, information stored in each wireless tag is surely read.

In a preferred embodiment of the present invention, the metal material includes iron.

According to the embodiment, since the iron intervenes between the first and second high magnetic permeability members, even if a magnetic field for reading information stored in one wireless tag is relatively strong, the iron prevents the magnetic field from affecting another wireless tag at a time when information stored in the one wireless tag is magnetically read using the magnetic field. Therefore, even if a plurality of wireless tags is mounted in the gaming medium, information stored in each wireless tag is surely read.

DESCRIPTION OF THE EMBODIMENTS

With reference to FIGS. 1 to 15, an exemplary embodiment of the present invention will be described below. In the exemplary embodiment, a gaming system includes a gaming table apparatus and gaming media. A gaming system playing Othello game is cited as the gaming system of the present invention.

Figure 1:
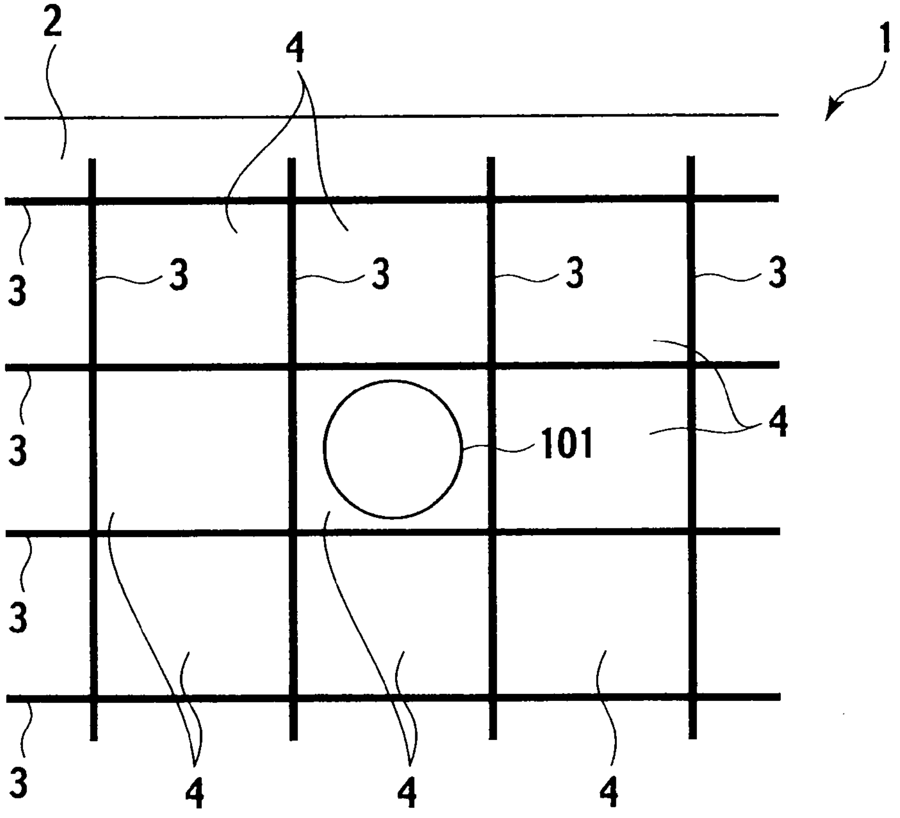
FIG. 1 is a plane view of a gaming table of a gaming table apparatus according to an exemplary embodiment of the present invention.
Figure 2A:
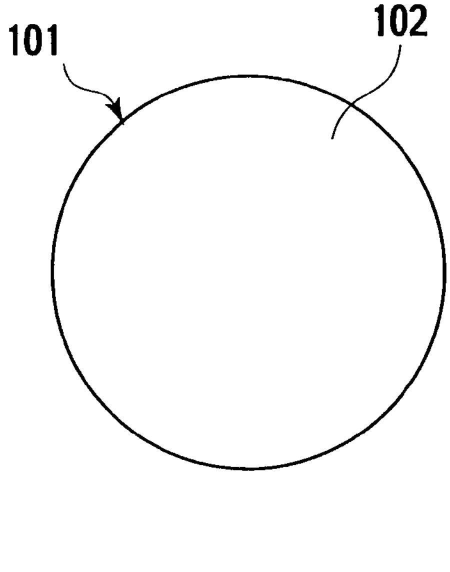
FIG. 2A is a plane view of a gaming medium according to the exemplary embodiment of the present invention.
Figure 2B:
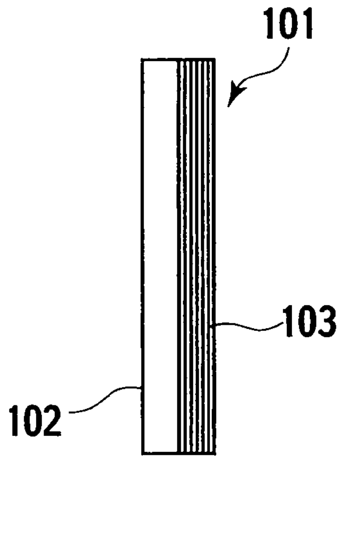
FIG. 2B is a side view of the gaming medium according to the exemplary embodiment of the present invention.
Figure 3:
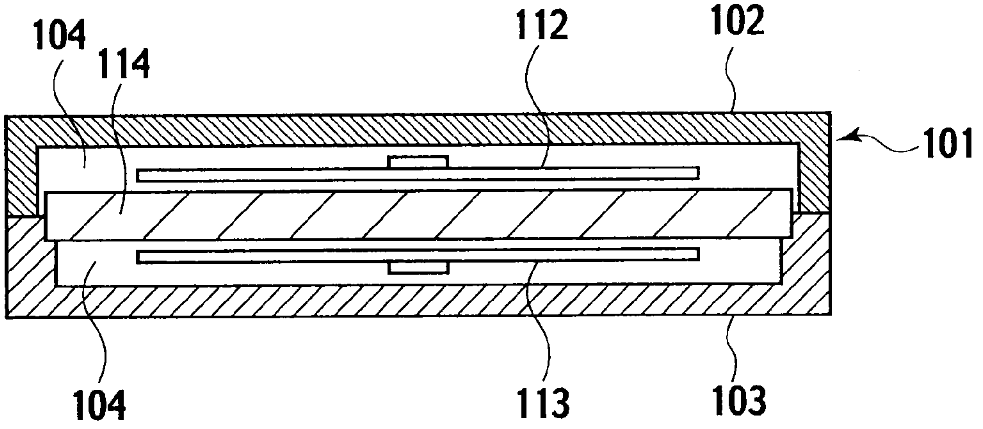
FIG. 3 is a vertical cross-sectional view of the gaming medium according to the exemplary embodiment of the present invention.

As shown in FIG. 1, a surface on a gaming table 2 is divided into a plurality of lattice-shaped regions 4 by a plurality of lines 3. It is noted that although only nine regions 4 are shown in FIG. 1, there are really more than nine regions 4 on the surface on the gaming table 2. A plurality of gaming media 101 for Othello game is placed on the gaming table 2 during Othello game. One gaming medium 101 is placed on one region 4.

A gaming medium 101 is a disk-shaped chip and has a white side 102 and a black side 103. During game play, the gaming medium 101 is placed on a region 4 so that the white side 102 (or the black side 103) corresponds to the upper side of the gaming medium 101. With the progress of game play, it is possible to reverse the gaming medium 101 on the region 4 so that the black side 103 (or the white side 102) corresponds to the upper side of the gaming medium 101.

The gaming medium 101 includes a hollow portion 104 therein. Inlays 112 and 113 are mounted in the hollow portion 104. Circuits of wireless tags and coil antennas are respectively formed in the inlays 112 and 113. A high magnetic permeability member 114 is made of high magnetic permeability material and placed between the inlays 112 and 113. The inlay 112 is situated nearer the white side 102 in relation to the high magnetic permeability member 114 in the hollow portion 104. The inlay 113 is situated nearer the black side 103 in relation to the high magnetic permeability member 114 in the hollow portion 104.

Information regarding the gaming medium 101 stored in a wireless tag of the inlay 112 and a wireless tag of the inlay 113 embedded into the gaming medium 101 in common, includes a unique number for identifying the gaming medium 101. The information may further include value (e.g., one-dollar, five-dollar or ten-dollar) of the gaming medium 101, color of the gaming medium 101, a place where the gaming medium 101 is allowed to be used (information for identifying a casino or a game arcade where the gaming medium 101 is allowed to be used), and information of game progress data and the like. It is noted that, under a condition where the information includes only the unique number of the gaming medium 101 and other data are associated with the unique number and stored in a server within a casino or a game arcade as the database, an information detecting device 11 may detect other data on the basis of the unique number read from the wireless tag of the gaming medium 101 while referring to the database stored in the server.

An odd number is stored in the wireless tag 72 of the white side 102 as a unique number for identifying the white side 102 of the gaming medium 101, and an even number is stored in the wireless tag 72 of the black side 103 as a unique number for identifying the black side 103 of the gaming medium 101.

Figure 4:
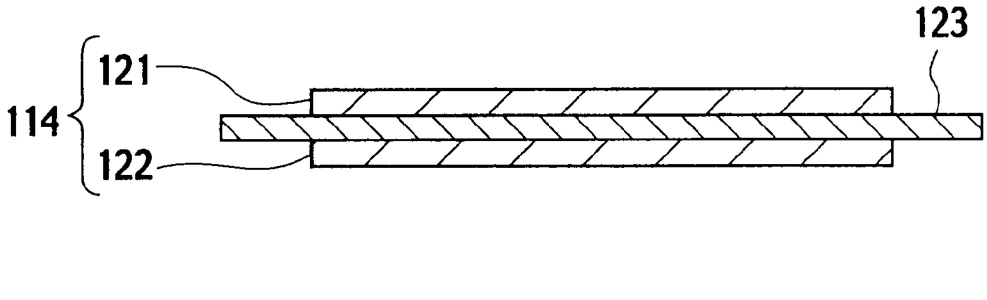
FIG. 4 is a vertical cross-sectional view of laminated structure where a metal plate intervenes between high magnetic permeability members according to a modified example of the exemplary embodiment of the present invention.

In a modified example of the exemplary embodiment, as shown in FIG. 4, the high magnetic permeability member 114 is composed of high magnetic permeability members 121 and 122 and a metal plate 123 intervenes between the high magnetic permeability members 121 and 122. It is preferable to use iron as metal material of which the metal plate 123 is made.

Next, the information detecting device 11 will be described with reference to FIG. 5.

Figure 5:
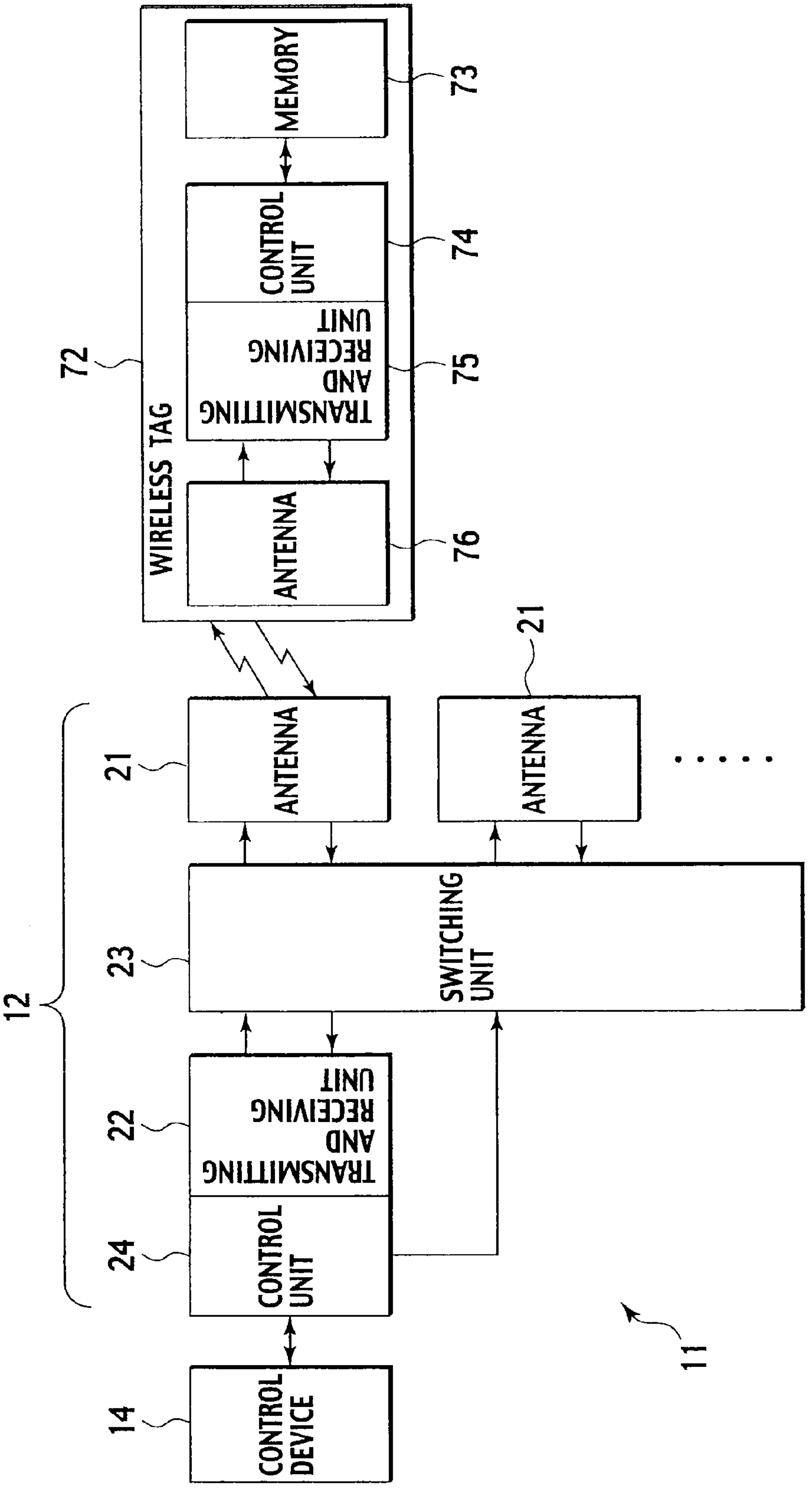
FIG. 5 is a block diagram of electrical connections of a reading device and a control device which are included in an information detecting device of the gaming table apparatus, and a wireless tag which is mounted in an inlay of the gaming medium, according to the exemplary embodiment of the present invention.

As shown in FIG. 5, the information detecting device 11 is a device that reads information stored in the gaming medium 101 (wireless tag 72 of the gaming medium 101) and includes a reading device 12 and a control device 14. The control device 14 instructs the reading device 12 to generate a magnetic field to supply electric power to the wireless tag 72 or to transmit information received from the wireless tag 72 and stored in the wireless tag 72.

The reading device 12 includes antennas (loop antennas) 21, a transmitting and receiving unit 22, a switching unit 23 and a control unit 24. The control unit 24 receives an instruction from the control device 14 and drives the transmitting and receiving unit 22 and the switching unit 23 according to the instruction. The transmitting and receiving unit 22 generates a magnetic field for supplying electric power to the wireless tag 72 through each antenna 21. More specifically, the transmitting and receiving unit 22 switches the antennas 21 using the switching unit 23 in series, to generate a magnetic field from each antenna 21. At this time, the transmitting and receiving unit 22 receives a radio wave signal using each antenna 21 and the switching unit 23 and demodulates the radio wave signal with load modulation to read information stored in the wireless tag 72.

The wireless tag 72 is a magnetic field type wireless tag and includes a memory 73, a control unit 74, a transmitting and receiving unit 75 and an antenna 76. The memory 73 is a memory device that stores a unique number (identification number) for identifying the gaming medium 101 and a unique number (odd/even number) for identifying the white/black side of the gaming medium 101. It is noted that the memory 73 may store value (e.g., one-dollar, five-dollar or ten-dollar) of the gaming medium 101, color of the gaming medium 101, a place where the gaming medium 101 is allowed to be used (information for identifying a casino or a game arcade where the gaming medium 101 is allowed to be used), and information of game progress data and the like. The control unit 74 interprets a command, a request or an instruction received from the reading device 12 and executes action corresponding to the command, the request or the instruction. The transmitting and receiving unit 75 includes a modulating unit (not shown) and a demodulating unit (not shown), and modulates or demodulates a signal for communicating with the reading device 12. The antenna 76 supplies electric power to the transmitting and receiving unit 75 by a magnetic field from the reading device 12, and receives a modulated wave from the transmitting and receiving unit 75 and emits the modulated wave into air so that the reading device 12 receives it.

Although the information detecting device 11 supplies electric power to the wireless tag 72 and reads information stored in the wireless tag 72, using a common antenna 21, the information detecting device 11 may supply electric power to the wireless tag 72 using one antenna and read information stored in the wireless tag 72 using another antenna.

Figure 6:
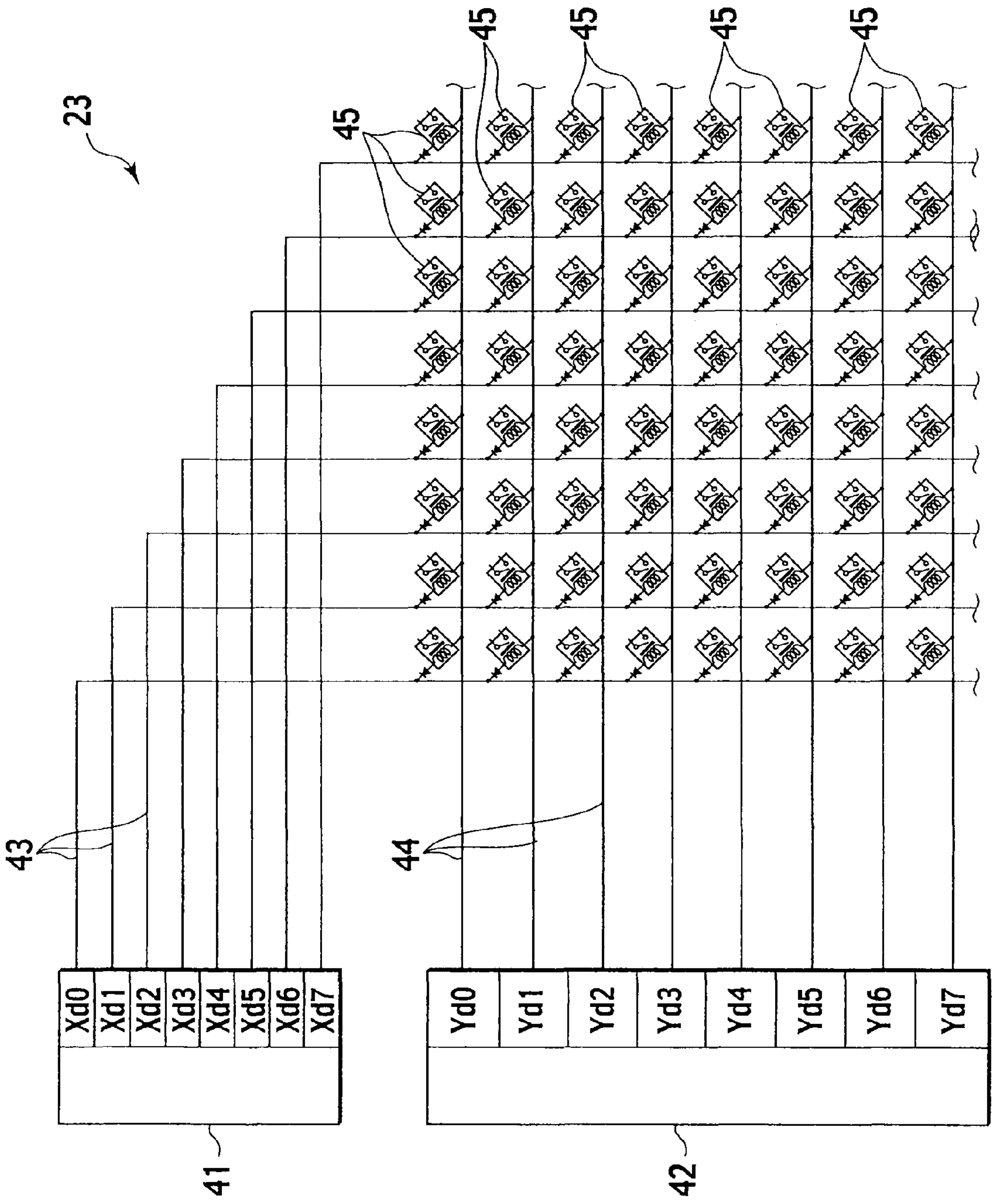
FIG. 6 is a circuit diagram illustrating a configuration of a switching unit of the reading device shown in FIG. 5.
Figure 7:
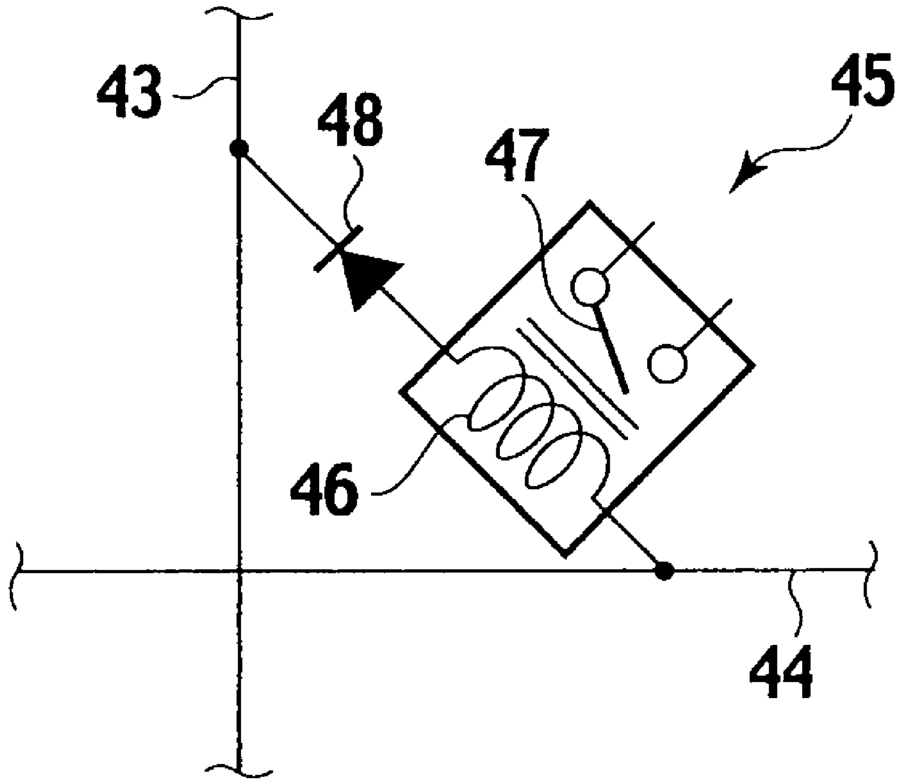
FIG. 7 is a circuit diagram illustrating the configuration of the switching unit of the reading device shown in FIG. 5.

Next, the switching unit 23 will be described with reference to FIGS. 6 to 8.

The switching unit 23 includes an X-side scan driver 41 and a Y-side scan driver 42. Plural X-side transmitting lines 43 extend from the X-side scan driver 41 along a longitudinal direction (or lateral direction) in parallel with one another. Plural Y-side transmitting lines 44 extend from the Y-side scan driver 42 along a lateral direction (or longitudinal direction) in parallel with one another. At each cross point where one X-side transmitting line 43 crosses one Y-side transmitting line 44, a relay circuit 45 is connected. As shown in FIG. 7, each relay circuit 45 is connected to the X-side transmitting line 43 at one side of a coil 46 and the Y-side transmitting line 44 at the other side of the coil 46. A diode 48 is connected to the coil 46 and the X-side transmitting line 43 so that a cathode side and an anode side correspond to the X-side transmitting line side and the coil side respectively. In order to tune off the relay circuit 45, the X-side transmitting line 43 and the Y-side transmitting line 44 are held at H and L levels respectively. Ordinarily, the X-side transmitting line 43 and the Y-side transmitting line 44 keep this condition. On the other hand, in order to tune on the relay circuit 45, the X-side transmitting line 43 and the Y-side transmitting line 44 are switched to L and H levels respectively. This allows current to flow the coil 46 to close a switch 47.

Figure 8:
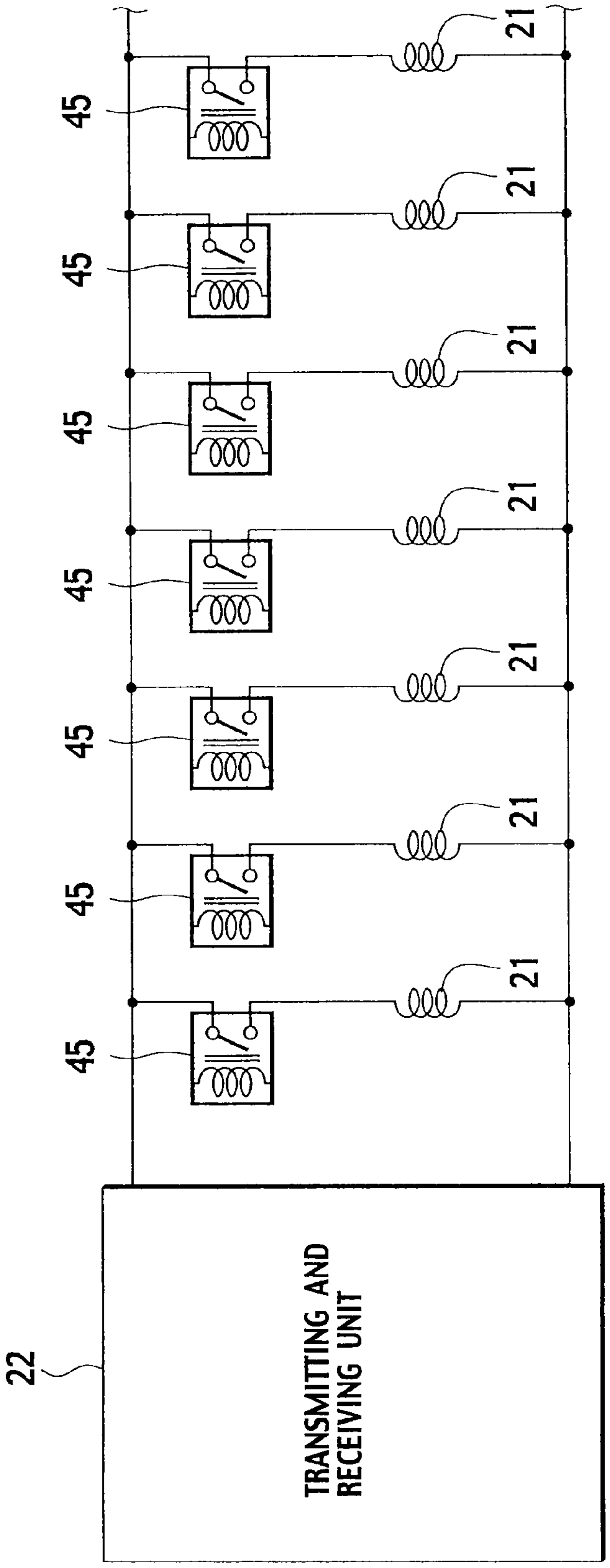
FIG. 8 is a circuit diagram illustrating the configuration of the switching unit and antennas of the reading device shown in FIG. 5.

As shown in FIG. 8, one antenna 21 is connected to the relay circuit 45 in series. In this connection, when the relay circuit 45 is turned off, the antenna 21 is not driven. When the relay circuit 45 is turned on, the antenna 21 is driven. The relay circuit 45 is a high frequency wave relay.

Next, the arrangement of the antennas 21 in the gaming table 2 will be described with reference to FIG. 9.

Figure 9:
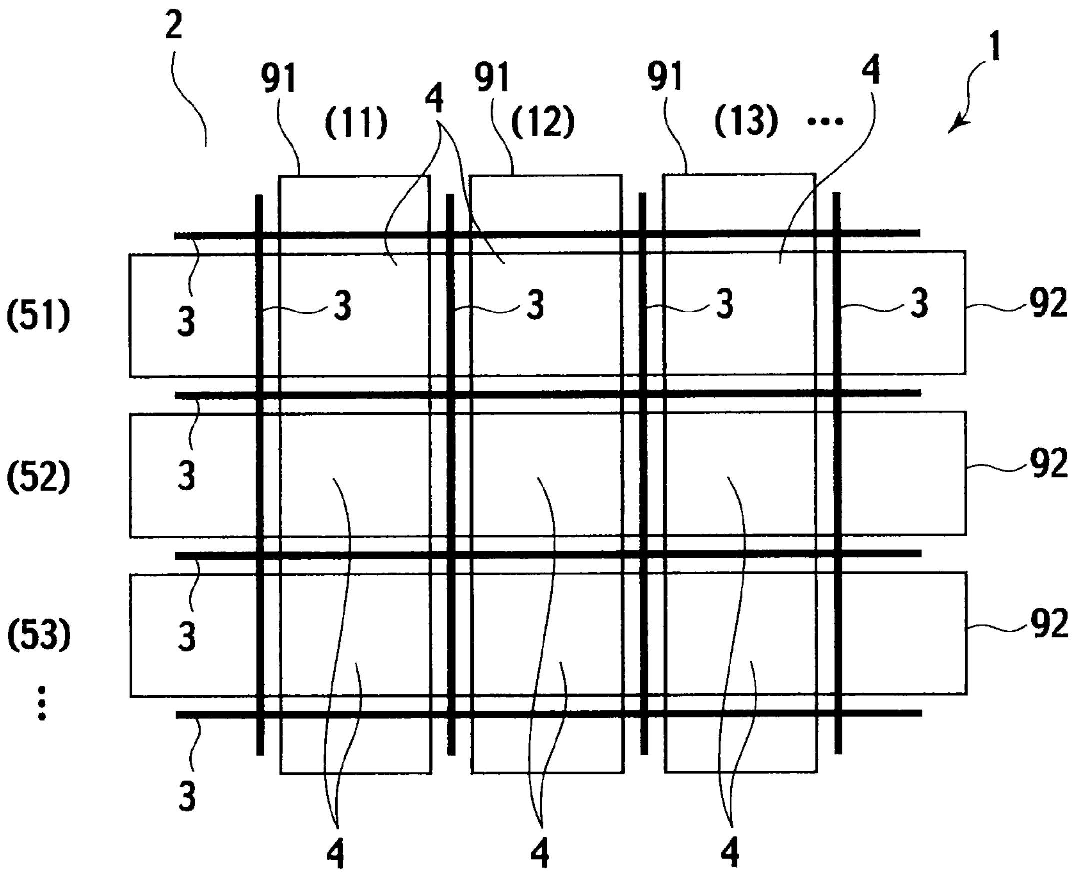
FIG. 9 is an explanatory diagram illustrating one example of an arrangement of antennas in the gaming table shown in FIG. 1.

FIG. 9 illustrates one example of the arrangement of antennas 21 in the gaming table 2. As shown in FIG. 9, the numbers "11", "12", "13" of columns 91 and the numbers "51", "52", "53". . . of rows 92 are assigned to the gaming table 2. Thus, each region 4 has a block number composed of the numbers of one column 91 and one row 92. One or more antennas 21 are arranged to each column 91 (or each row 92). The reading device 12 drives one or more antennas 21 arranged to one column 91 to read one or more pieces of information stored in one or more wireless tags 72 of one or more gaming media 101 placed on the one column 91. Also, the reading device 12 drives one or more antennas 21 arranged to one row 92 to read one or more pieces of information stored in one or more wireless tags 72 of one or more gaming media 101 placed on the one row 92.

For example, the reading device 12 firstly drives one or more antennas 21 arranged to each column 91 in series, in order of increasing the number of the column 91 from the number "11". Next, the reading device 12 drives one or more antennas 21 arranged to each row 92 in series, in order of increasing the number of the row 92 from the number "51". We assume that gaming media 101 are placed on regions 4 having the column number "11". In this case, the reading device 12 firstly determines whether or not one or more gaming media 101 are placed on regions 4 having one column number, in order of increasing the number of the column 91 from the number "11". If one or more gaming media 101 are placed on regions 4 having one column number, the reading device 12 reads one or more pieces of information stored in one or more wireless tags 72 of the one or more gaming media 101. Next, the reading device 12 determines whether or not one or more gaming media 101 are placed on regions 4 having one row number, in order of increasing the number of the row 92 from the number "51". If one or more gaming media 101 are placed on regions 4 having one row number, the reading device 12 reads one or more pieces of information stored in one or more wireless tags 72 of the one or more gaming media 101. Therefore, the reading device 12 can read information stored in a wireless tag 72 of a gaming medium 101 placed on each region 4 having the column number "11" by carrying out AND operation between the reading result of the column number "11" and that of each row number.

Figure 10:
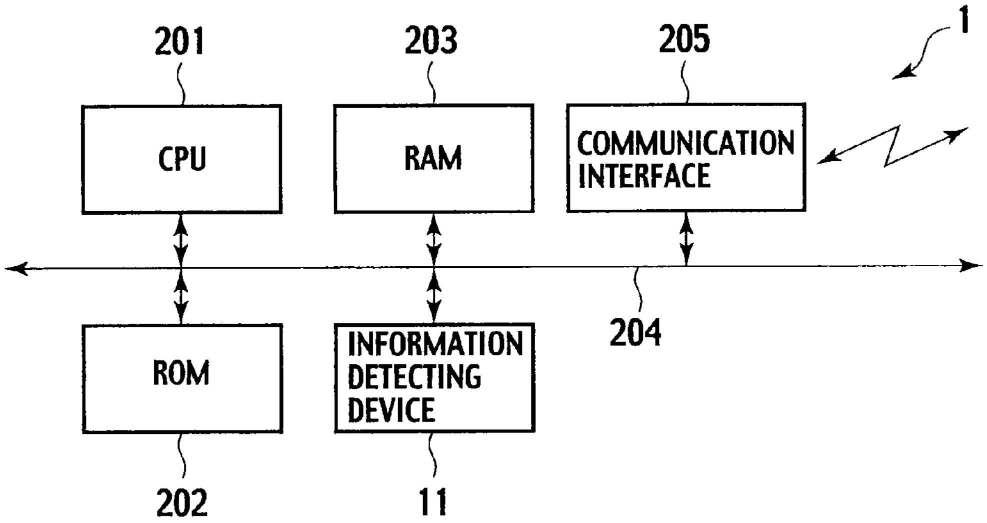
FIG. 10 is a block diagram of electrical connections in the gaming table apparatus according to the exemplary embodiment of the present invention.

FIG. 10 illustrates a block diagram of electrical connections in the gaming table apparatus 1. The gaming table apparatus 1 includes the information detecting device 11, a CPU 201, a ROM 202, a RAM 203, a bus 204 and a communication interface 205. The CPU 201 carries out various calculations and centrally controls each element of the gaming table apparatus 1. The ROM 202 stores various fixed data and a control program therein. The RAM 203 is a work area of the CPU 201. The communication interface 205 communicates with another server devices or the like in the casino hotel or the game arcade. The information detecting device 11, the CPU 201, the ROM 202 and the RAM 203 and the communication interface 205 are connected to one another via the bus 204.

Next, operation of the gaming system including the gaming table apparatus 1 and the gaming medium 101 will be described with reference to FIGS. 11 to 14.

Gaming media 101 are sequentially placed on the gaming table 2 during game play. With the progress of game play, it is possible to reverse a gaming medium 101 on the region 4 so that the upper side of the gaming medium 101 is changed from a black side 103 (or white side 102) to a white side 102 (or black side 103). The information detecting device 11 reads information stored in a wireless tag 72 of a gaming medium 101 placed on each region 4 of the gaming table 2 from the bottom surface side of the gaming table 2.

Figure 11:
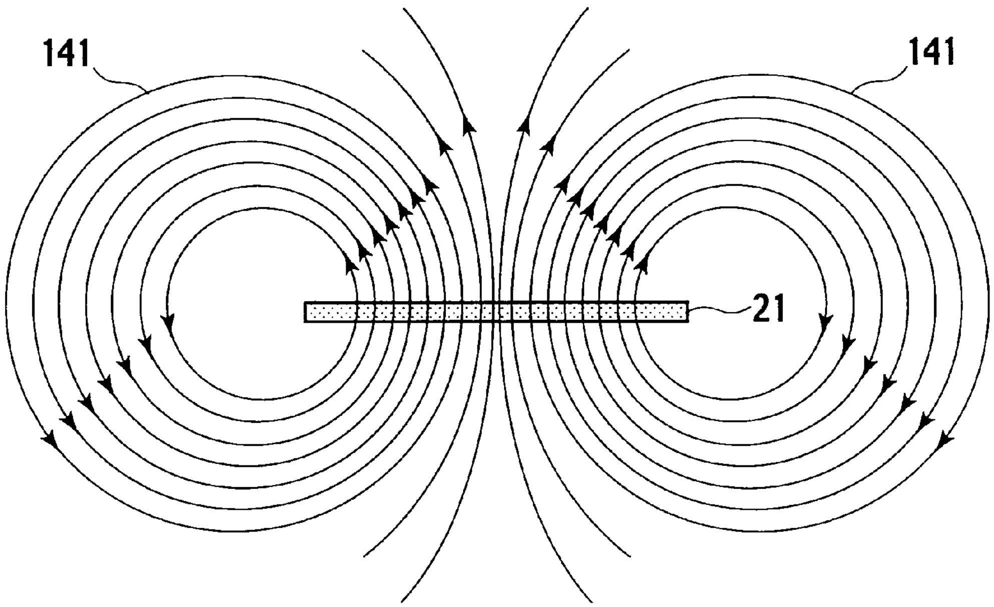
FIG. 11 is an explanatory diagram illustrating a magnetic field generated by a loop antenna according to the exemplary embodiment of the present invention.
Figure 12:
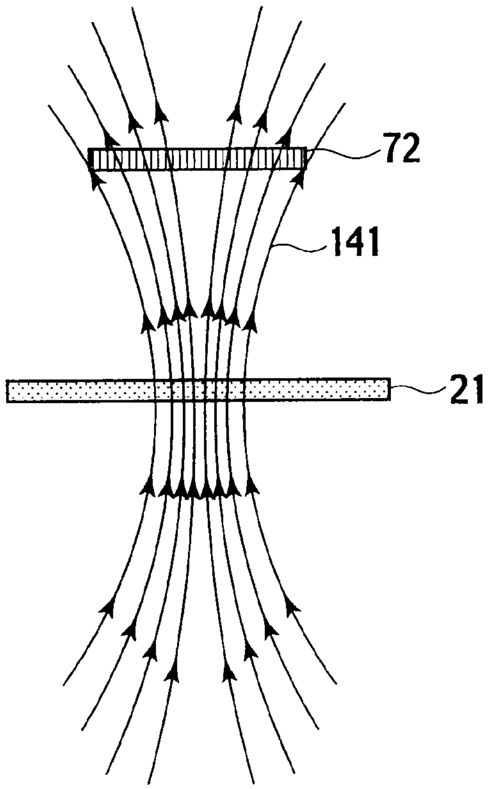
FIG. 12 is an explanatory diagram illustrating behavior of a gaming system according to the exemplary embodiment of the present invention.

The reading operation of a wireless tag 72 of a gaming medium 101 will be described. FIG. 11 illustrates a magnetic field 141 generated by an antenna 21 that is a loop antenna. FIG. 12 illustrates a state where one wireless tag 72 of a gaming medium 101 enters the magnetic field 141 generated by the antenna 21. Normally, when the wireless tag 72 enters the magnetic field 141 and then a magnetic flux traverses the coil antenna 76 mounted in the wireless tag 72, electric power is supplied to the wireless tag 72, which allows the wireless tag 72 to transmit to the information detecting device 11 a modulated signal based on information stored in the memory 73.

Figure 13:
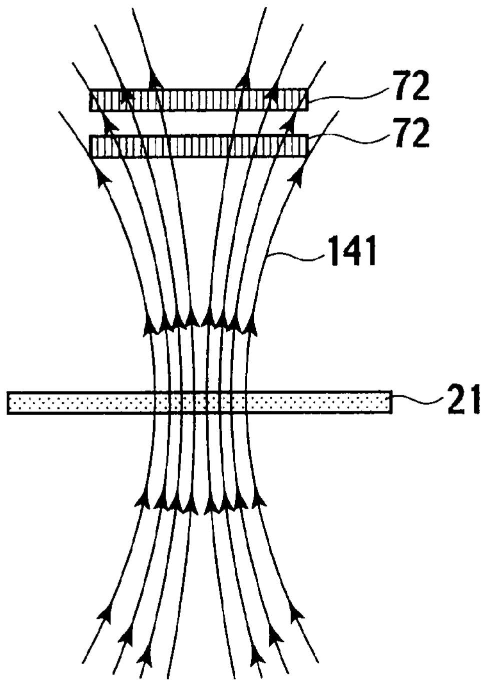
FIG. 13 is an explanatory diagram illustrating behavior of a gaming system according to the exemplary embodiment of the present invention.

FIG. 13 illustrates a state where two wireless tags 72 of a gaming medium 101 enter the magnetic field 141 generated by the antenna 21. In a case where a high magnetic permeability member 114 is not placed between these wireless tags 72, when the magnetic field 141 passes through these wireless tags 72, electric power is supplied to these wireless tags 72. This prevents the information detecting device 11 from reading two pieces of information stored in the wireless tags 72 due to mutual interference, or allows the information detecting device 11 to read two pieces of information stored in the wireless tags 72 simultaneously.

Figure 14:
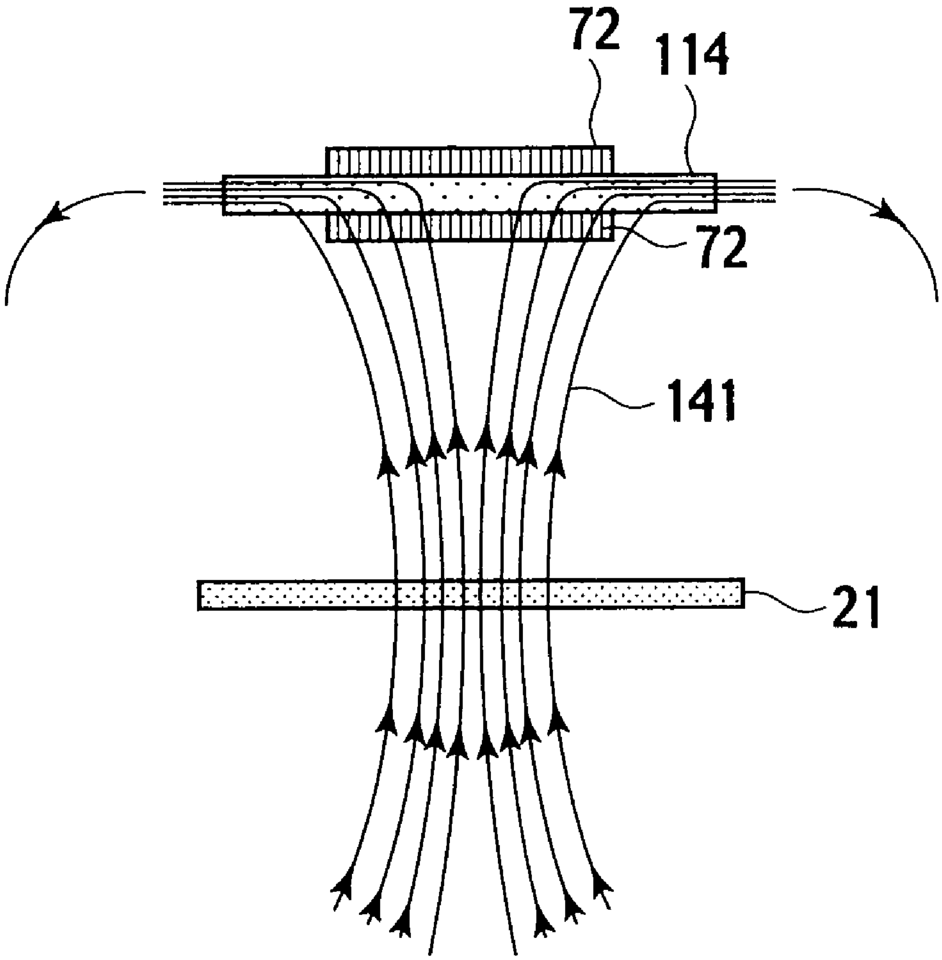
FIG. 14 is an explanatory diagram illustrating behavior of a gaming system according to the exemplary embodiment of the present invention.

FIG. 14 illustrates a state where two wireless tags 72 between which a high magnetic permeability member 114 is placed enter the magnetic field 141 generated by the antenna 21. When the magnetic field 141 passes through one wireless tag 72 close to the antenna 21 and enters the high magnetic permeability member 114, the magnetic field 141 flows along the high magnetic permeability member 114 to be guided toward both sides of the high magnetic permeability member 114 because the high magnetic permeability has magnetic permeability more higher than one of air. Therefore, the magnetic field 141 does not pass through another wireless tag 72 away from the antenna 21.

This means that the magnetic field 141 having passed through one wireless tag 72 close to the antenna 21 flows along the high magnetic permeability member 114 having magnetic permeability more higher than one of air to be guided both sides of the high magnetic permeability member 114, and does not pass through another wireless tag 72 away from the antenna 21. Therefore, electric power is not supplied to another wireless tag 72 away from the antenna 21, which prevents another wireless tag 72 from transmitting a modulated signal to the information detecting device 11.

For the reason described above, if the white side 102 of the gaming medium 101 corresponds to the upper side of the gaming medium 101, the information detecting device 11 reads only information (identification information including a unique number for identifying the gaming medium 101 and a unique number for identifying the black side 103 of the gaming medium 101) stored in the wireless tag 72 in the inlay 113 situated nearer the black side 103 in relation to the high magnetic permeability member 114 in the hollow portion 104. This allows the gaming table apparatus 1 to recognize that the white side 102 of the gaming medium 101 corresponds to the upper side of the gaming medium 101 on the gaming table 2 based on the information stored in the wireless tag 72 situated nearer the black side 103. On the other hand, if the black side 103 of the gaming medium 101 corresponds to the upper side of the gaming medium 101, the information detecting device 11 reads only information (identification information including a unique number for identifying the gaming medium 101 and a unique number for identifying the white side 102 of the gaming medium 101) stored in the wireless tag 72 in the inlay 112 situated nearer the white side 102 in relation to the high magnetic permeability member 114 in the hollow portion 104. This allows the gaming table apparatus 1 to recognize that the black side 103 of the gaming medium 101 corresponds to the upper side of the gaming medium 101 on the gaming table 2 based on the information stored in the wireless tag 72 situated nearer the white side 102.

Therefore, a value of magnetic permeability of the high magnetic permeability is set to a value that, if the white side 102 of the gaming medium 101 corresponds to the upper side of the gaming medium 101 on the gaming table 2, the information detecting device 11 reads only information stored in the wireless tag 72 in the inlay 113 situated nearer the black side 103 in relation to the high magnetic permeability member 114 in the hollow portion 104, which prevents the information detecting device 11 from reading no piece of information from both wireless tag 72 due to mutual interference or reading two pieces of information from both wireless tag 72 simultaneously. As well, a value of magnetic permeability of the high magnetic permeability is set to a value that, if the black side 103 of the gaming medium 101 corresponds to the upper side of the gaming medium 101 on the gaming table 2, the information detecting device 11 reads only information stored in the wireless tag 72 in the inlay 112 situated nearer the white side 102 in relation to the high magnetic permeability member 114 in the hollow portion 104, which prevents the information detecting device 11 from reading no piece of information from both wireless tag 72 due to mutual interference or reading two pieces of information from both wireless tag 72 simultaneously. In practice, the value of magnetic permeability of the high magnetic permeability is determined depending on conditions such as the strength of magnetic field 141 to be generated by the information detecting device 11 and the like.

When the magnetic field 141 to be generated by the information detecting device 11 is relatively strong, as shown in FIG. 4, the gaming medium 101 is configured so that the high magnetic permeability member 114 is composed of the high magnetic permeability members 121 and 122 and a metal plate 123 made of metal material intervenes between the high magnetic permeability members 121 and 122. This configuration surely allows the magnetic field 141 to affect only one wireless tag 72. Namely, when a magnetic flux passing through the metal plate 123 increases as time elapses, eddy current flows on the metal plate 123 in a direction for preventing the flow of magnetic flux to reduce magnetic flux lines, which allows the magnetic field 141 to affect only one wireless tag 72. It is preferable to use iron as the metal material of which the metal plate 123 is made.

Figure 15:
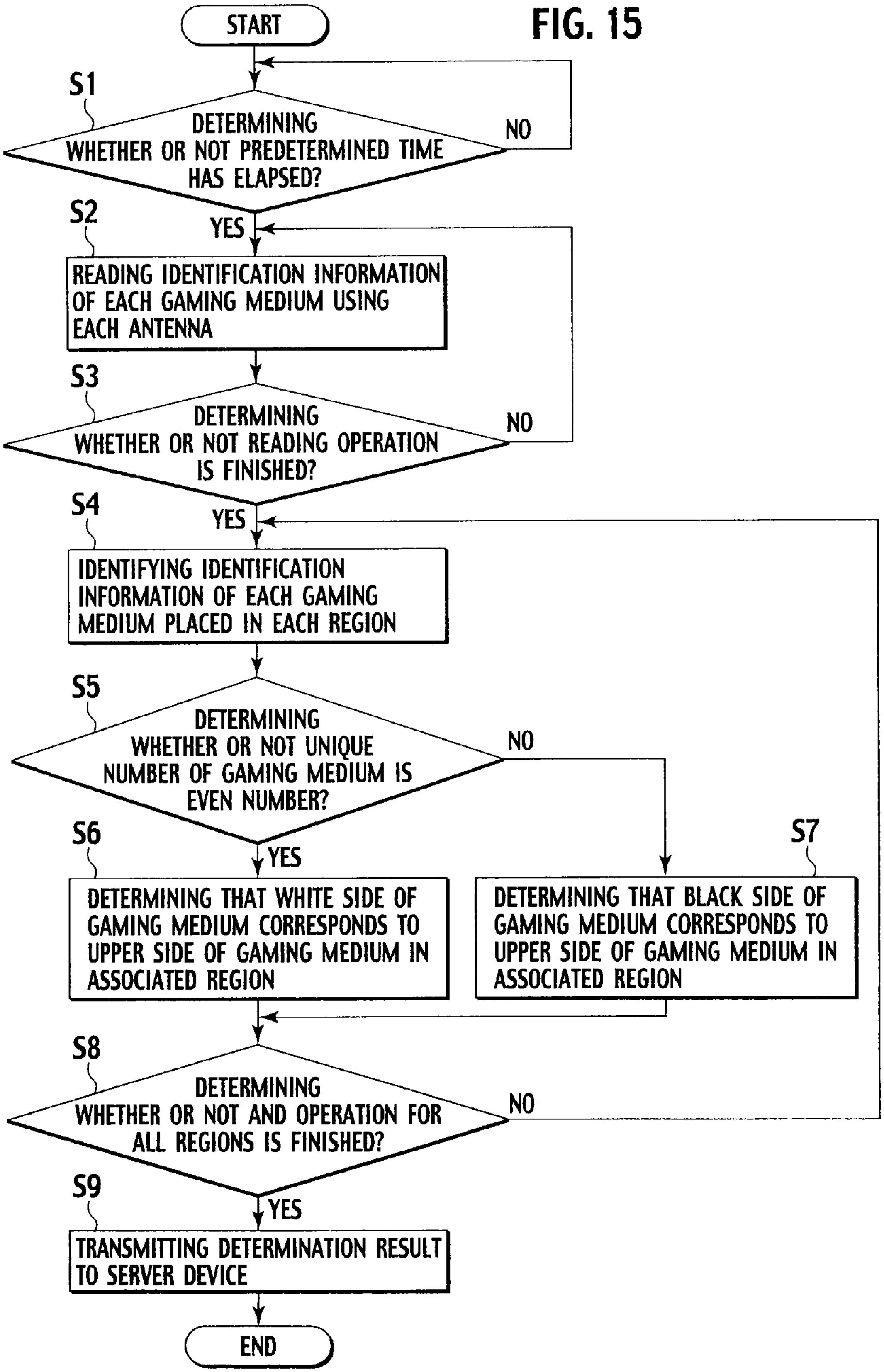
FIG. 15 is a flowchart illustrating behavior of a gaming table apparatus according to the exemplary embodiment of the present invention.

Next, the processing that the CPU 201 of the gaming table apparatus 1 executes will be described with reference to FIG. 15.

In step S1, the CPU 201 determines whether or not a predetermined time has elapsed (for example, one second has elapsed if the reading operation is carried out every one second). If the predetermined time has not elapsed, the process remains in step S1. If the predetermined time has elapsed, the process proceeds to step S2. In step S2, the CPU 201 drives each antenna 21 on each column 91 and each antenna 21 of each row 92 in series using the information detecting device 11, and reads identification information stored in a wireless tag 72 of each gaming medium 101 on the gaming table 2. In step S3, the CPU 201 determines whether or not the reading operation is finished. If the reading operation is not finished, the process returns to step S2. If the reading operation is finished, the process proceeds to step S4. In step S4, the CPU 201 carries out AND operation between the reading result of each column 91 and that of each row 92 to identify identification information of each gaming medium 101 placed in each region 4.

In this case, when the white side 102 of the gaming medium 101 corresponds to the down side of the gaming medium 101, the CPU 201 identifies a unique number included in identification information stored in the wireless tag 72 in the inlay 112 situated nearer the white side 102 in relation to the high magnetic permeability member 114 in the hollow portion 104. On the other hand, when the black side 103 of the gaming medium 101 corresponds to the down side of the gaming medium 101, the CPU 201 identifies a unique number included in identification information stored in the wireless tag 72 in the inlay 113 situated nearer the black side 103 in relation to the high magnetic permeability member 114 in the hollow portion 104. Since an odd number is stored in the wireless tag 72 of the white side 102 as the unique number, and an even number is stored in the wireless tag 72 of the black side 103 as the unique number, when the CPU 201 identifies an even number, the black side 103 of the gaming medium 101 corresponds to the down side of the gaming medium 101 (the white side 102 of the gaming medium 101 corresponds to the upper side of the gaming medium 101). On the other hand, when the CPU 201 identifies an odd number, the white side 102 of the gaming medium 101 corresponds to the down side of the gaming medium 101 (the black side 103 of the gaming medium 101 corresponds to the upper side of the gaming medium 101).

In step S5, the CPU 201 determines whether or not an even number stored in each wireless tag 72 read is identified. If the even number is identified, the process proceeds to step S6. If the even number is not identified, the process proceeds to step S7. In step S6, the CPU 201 determines that the white side 102 of the gaming medium 101 corresponds to the upper side of the gaming medium 101 on an associated region 4. In step S7, the CPU 201 determines that the black side 103 of the gaming medium 101 corresponds to the upper side of the gaming medium 101 on an associated region 4. In step 8, the CPU 201 determines whether or not the AND operation for all regions 4 is finished. If the AND operation for all regions 4 is not finished, the process returns to step S4. If the AND operation for all regions 4 is finished, the process proceeds to step S9. In step S9, the CUP 201 transmits the determination result to a predetermined server device or the like.

In this exemplary embodiment, although the CPU 201 of the gaming table apparatus 1 determines which of the white side 102 and the black side 103 of the gaming medium 101 corresponds to the upper side of the gaming medium 101, the CPU 201 of the gaming table apparatus 1 may transmit the identification information stored in the wireless tag 72 of the gaming medium 101 on an associated region 4 to the server device, and the server device may carries out the processing of steps S5 to S7.

In this exemplary embodiment, although the gaming system playing Othello game is cited as the gaming system of the present invention, the gaming system of the present invention is not limited to the gaming system playing Othello game. For example, the present invention may be applied to a gaming system playing various games such as Japanese chess, a trump card game and a card game, each during which a gaming medium is used to be reversed and the fact that either one of two sides of the gaming medium corresponds to the upper side of the gaming medium has a meaning. Further, the gaming system of the present invention may use a polyhedral gaming medium such as dice or a spherical gaming medium such as roulette ball.

What is claimed is:

1. A gaming medium used in a game during which the gaming medium is placed on a gaming table and reversed from a first side to a second side of the gaming medium or from the second side to the first side, comprising:

a first wireless tag mounted on the first side wherein first information stored in the first wireless tag is magnetically read;

a second wireless tag mounted on the second side wherein second information stored in the second wireless tag is magnetically read; and a high magnetic permeability member placed between the first wireless tag and the second wireless tag, preventing a magnetic field from affecting the second wireless tag at a time when the first information stored in the first wireless tag is magnetically read using the magnetic field from the first side, and preventing a magnetic field from affecting the first wireless tag at a time when the second information stored in the second wireless tag is magnetically read using the magnetic field from the second side.

2. The gaming medium according to claim 1, wherein the high magnetic permeability member includes a first high magnetic permeability member on the firs side and a second high magnetic permeability member on the second side, and a metal material intervenes between the first high magnetic permeability member and the second high magnetic permeability member.

3. The gaming medium according to claim 2, wherein the metal material includes iron.

4. A gaming system comprising:

a gaming table;

a gaming medium used in a game during which the gaming medium is placed on the gaming table and reversed from a first side to a second side of the gaming medium or from the second side to the first side, wherein the gaming medium comprising:

a first wireless tag mounted on the first side wherein first information stored in the first wireless tag is magnetically read;

a second wireless tag mounted on the second side wherein second information stored in the second wireless tag is magnetically read; and a high magnetic permeability member placed between the first wireless tag and the second wireless tag, preventing a magnetic field from affecting the second wireless tag at a time when the first information stored in the first wireless tag is magnetically read using the magnetic field from the first side, and preventing a magnetic field from affecting the first wireless tag at a time when the second information stored in the second wireless tag is magnetically read using the magnetic field from the second side;

a reading unit that magnetically reads information stored in the first wireless tag or the second wireless tag of the gaming medium placed in a placement region formed on the gaming table; and an identifying unit that identifies that either one of the first side and the second side corresponds to the upper side of the gaming medium placed in the placement region on the basis of information magnetically read by the reading unit.

5. The gaming system according to claim 4, wherein the high magnetic permeability member includes a first high magnetic permeability member on the firs side and a second high magnetic permeability member on the second side, and a metal material intervenes between the first high magnetic permeability member and the second high magnetic permeability member.

6. The gaming system according to claim 5, wherein the metal material includes iron.

* * * * *